(12) United States Patent
Watanabe

(10) Patent No.: US 7,436,601 B2
(45) Date of Patent: Oct. 14, 2008

(54) TWO-GROUP ZOOM LENS AND AN ELECTRONIC IMAGING APPARATUS HAVING IT

(75) Inventor: Masahito Watanabe, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 315 days.

(21) Appl. No.: 11/438,317

(22) Filed: May 23, 2006

(65) Prior Publication Data

US 2006/0274427 A1    Dec. 7, 2006

(30) Foreign Application Priority Data

Jun. 2, 2005    (JP) .............................. 2005-162569

(51) Int. Cl.
    *G02B 15/14*    (2006.01)

(52) U.S. Cl. ...................................... 359/691; 359/680

(58) Field of Classification Search ................. 359/691, 359/680–682
    See application file for complete search history.

(56) References Cited

U.S. PATENT DOCUMENTS

| | | | |
|---|---|---|---|
| 6,169,635 B1 * | 1/2001 | Ozaki et al. ................. | 359/691 |
| 6,809,882 B2 * | 10/2004 | Takatsuki .................... | 359/691 |
| 2003/0030918 A1 * | 2/2003 | Murayama .................. | 359/691 |
| 2003/0210471 A1 | 11/2003 | Mihara et al. | |

* cited by examiner

*Primary Examiner*—Jordan M Schwartz
(74) *Attorney, Agent, or Firm*—Kenyon & Kenyon LLP

(57) ABSTRACT

The two-group zoom lens comprises in order from the object side, the first negative lens group, and the second positive lens group. Change of magnification from a wide angle end to a telephoto end is performed by narrowing the interval between two lens groups, and the first negative lens group is moved toward the object side when focusing from focusing at the infinite object point to focusing at a short-distance object point performed, and specific conditions are satisfied.

10 Claims, 8 Drawing Sheets

FIG.1
(W)
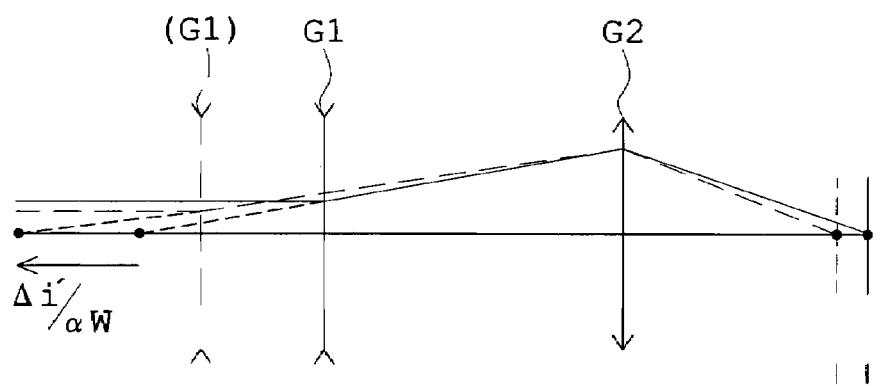
(T)
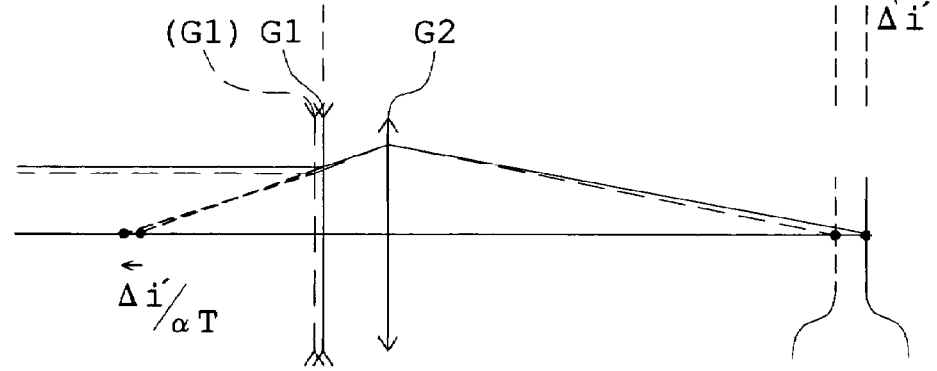
LIGHT RECEIVING SURFACE POSITION
PLANNED IMAGE FORMING SURFACE

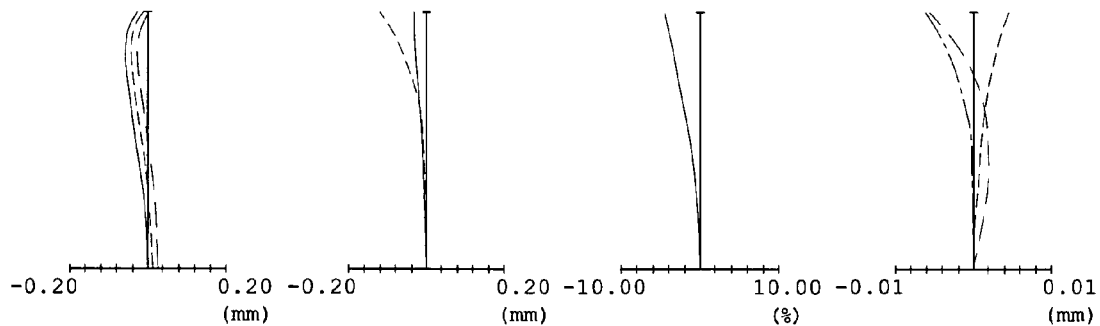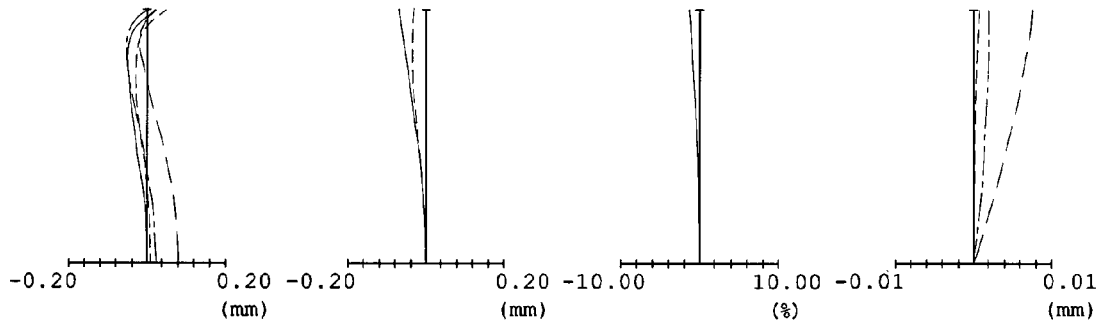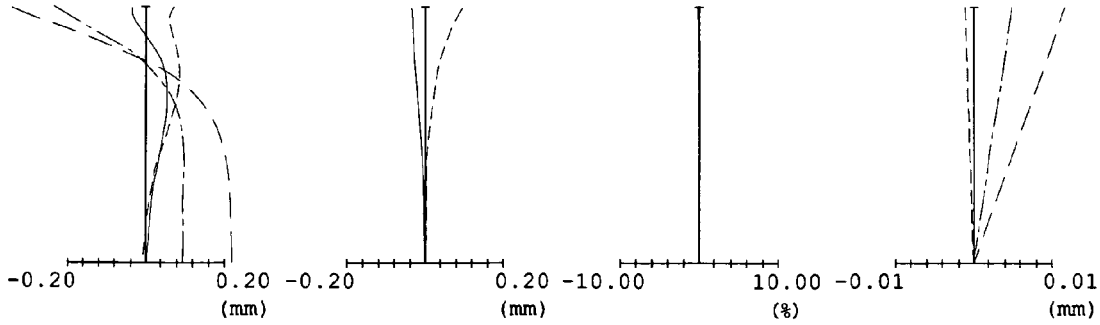

| FIG.5A | FIG.5B | FIG.5C | FIG.5D |
|---|---|---|---|
| SPHERICAL ABERRATION | ASTIGMATISM | DISTORTION | CHROMATIC ABERRATION OF MAGNIFICATION |
| Fno. 3.59 | IH=3.92 | IH=3.92 | IH=3.92 |

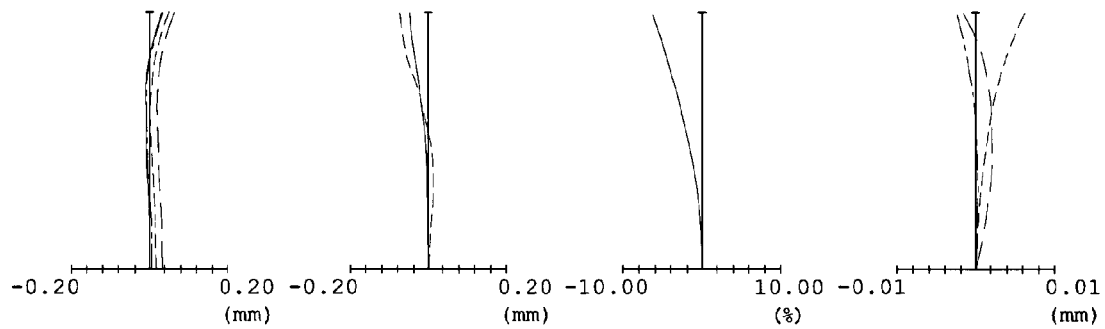

| FIG.5E | FIG.5F | FIG.5G | FIG.5H |
|---|---|---|---|
| SPHERICAL ABERRATION | ASTIGMATISM | DISTORTION | CHROMATIC ABERRATION OF MAGNIFICATION |
| Fno. 4.14 | IH=3.92 | IH=3.92 | IH=3.92 |

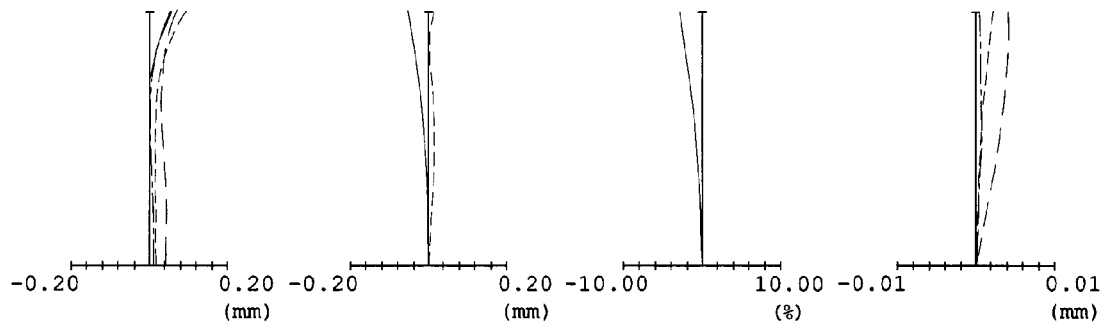

| FIG.5I | FIG.5J | FIG.5K | FIG.5L |
|---|---|---|---|
| SPHERICAL ABERRATION | ASTIGMATISM | DISTORTION | CHROMATIC ABERRATION OF MAGNIFICATION |
| Fno. 5.07 | IH=3.92 | IH=3.92 | IH=3.92 |

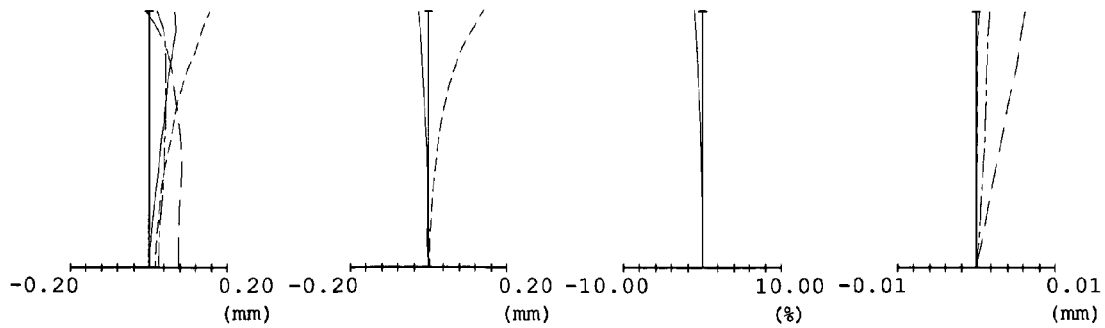

– – – – 435.84nm  
– · – · – 486.13nm  
– – – – – 656.27nm  
———— 587.56nm

TWO-GROUP ZOOM LENS AND AN ELECTRONIC IMAGING APPARATUS HAVING IT

This application claims benefits of Japanese Application No. 2005-162569 filed in Japan on Jun. 2, 2005, the contents of which are incorporated by this reference.

BACKGROUND OF THE INVENTION

1. Field of the Invention

The present invention relates to a two-group zoom lens system and an electronic imaging apparatus equipping the two-group zoom lens system which are used especially for a digital camera and a video camera in which thinning of the apparatus is realized by improving optical-system portions of the zoom lens system.

2. Description of the Related Art

In recent years, a zoom lens system has been generally used as a photographing lens for an electronic imaging apparatuses, such as a digital camera. Further, for achieving miniaturization of the electronic imaging apparatuses, such as a digital camera, etc., demand for thinning the zoom lens as a photographing lens is increasing. Therefore, the miniaturization of the lens which constitutes the zoom lens used for the digital camera has been attempted.

However, if the lens which constitutes the zoom lens is made small manufacture error of the lens parts constituting the zoom lens, and attachment error generated in attaching to a lens holding body will become relatively larger than those in the former constitution.

Even if in the case where the manufacture error of lens part, the attachment error to the lens holding body, etc., can be disregarded, there is a case that by expansion of a lens holding frame and the lens itself due to the influence of change of temperature or humidity etc., an actual light receiving surface position of an image sensor to a zoom lens and a predetermined image forming surface position may not be coincided.

So, in a zoom lens having focusing mechanism, a lens group which is moved when focusing is performed, performs focusing, and simultaneously, corrects shift of the position of an image surface generated between the position of a predetermined image forming surface, and the position of the actual light receiving surface.

However, in such case that the lens group which is moved when focusing is performed simultaneously, carries out correction of the shift of the image surface position between the position of the predetermined image forming surface and the actual light receiving surface position besides carrying out focusing, since it is necessary to secure a domain for movement of a lens group which is moved when focusing is performed, and to keep allowance in the interval between each of lens groups, it is difficult to achieve shortening of a full length of the zoom lens.

Generally, in the zoom lens which consists of two or more lens groups, magnification is performed by changing interval between two or more lens groups when the magnification is performed. However, for achieving miniaturization when a zoom lens is contained in a camera, it is possible to adopt a zoom lens having two groups which are of the minimum numbers of lens group. Technology relating to two-group zoom lens aiming at such magnification and miniaturization has been proposed in Toku Kai No. 2004-102211: Published Unexamined Patent Application.

The zoom lens shown in the publication, has in order from the object side, a lens-group A having negative refracting power, and a lens-group B having positive refracting power, wherein the lens group B having three meniscus lenses with convex surfaces directed toward the object side, and it is constituted so that magnification is performed by moving the lens-group A and the lens-group B, and in order to perform focusing from the infinite distance to the nearest position state, the first lens group is moved toward the object side.

SUMMARY OF THE INVENTION

The two-group zoom lens according to the present invention comprises, in order from an object side, a first lens group having negative refracting power, and a second lens group having positive refracting power, wherein by narrowing the interval between two lens groups, magnification from a wide angle end to a telephoto end is performed, and the first lens group having negative refracting power moves toward the object side when focusing from focusing at the infinite object point to focusing at a short-distance object point, and each of the following conditions is satisfied.

$$0.930 < |f_1|/\sqrt{(f_w \cdot f_T)} < 0.990$$

$$L_T/L_W > 1$$

$$1.0 < (\beta_{2w})^2 \times f_T/f_w < 1.20$$

$$1.2 < |\beta_{2T}| < 5$$

where f1 is a focal length of the first lens group, fW is a focal length of the whole system of the two-group zoom lens at the time of the infinite distance focusing at the wide angle position, fT is a focal length of the whole system of the two-group zoom lens when focusing of the infinite distance at the telephoto end is performed, and $L_w$ is a distance from the surface top nearest to the object side to the image forming surface as for the first lens group when focusing is performed at the wide angle end. $L_T$ is a distance from the surface top nearest to the object side to the image forming surface as for the first lens group when focusing is performed at the telephoto end. $\beta2_w$ is magnification of the second lens group when focusing to the object point of the infinite distance at the wide angle end is performed, and β2T is magnification of the second lens group when focusing to the object point of the infinite distance at the telephoto end is performed.

In the two-group zoom lens according to the present invention, it is desired that it is constituted such that the second lens group has two or more aspherical surfaces, where an aspherical surface nearest to the object side among the two or more aspherical surfaces is formed so that positive refracting power becomes weak as it departs from an optical axis, and the sign of curvature of the aspherical surface nearest to the object image side of the two or more aspherical surfaces differs on a center of an optical axis and its circumferential portion (in other words, the form of the surface has a point of inflection within an effective diameter on a section including an optical axis).

In the two-group zoom lens according to the present invention, it is desired that the second lens group comprises one lens component where the lens component consists of a lens having only two surfaces, air contact surfaces within an effective diameter are a surface nearest to an object side and a surface nearest to an image side, and the lens component is a single lens or a cemented lens.

Furthermore, in the two-group zoom lens according to the present invention, it is desired that a surface nearest to the object side and a surface nearest to the image side of the lens component are aspherical surfaces.

In the two-group zoom lens according to the present invention, it is desired that the lens component is composed with one cemented lens.

In the two-group zoom lens according to the present invention, it is desired that the lens component is constituted by a cemented lens consisting of three lenses in which in order from the object side, a positive lens, a negative lens, and a positive lens are arranged, and a surface nearest to the object side and a surface nearest to the image side of the cemented lens having three lenses are constituted to have a form where the convex surface is directed toward the space side on the optical axis, respectively.

In the two-group zoom lens according to the present invention, it is desired that the first lens is constituted such that in order from the object side, a negative lens component having a concave surface directed toward the image surface side and a positive meniscus lens component having a convex surface directed toward the object side are arranged, and a concave surface of the negative component is constituted so that its absolute value of paraxial radius of curvature is the smallest among the lens surfaces contacted with air in the first lens group. Here, the lens component consists of a lens having only two surfaces, air contact surfaces within an effective diameter are at the surface nearest to an object side and the surface nearest to an image side, and the lens component consists of a single lens or a cemented lens.

In the two-group zoom lens according to the present invention, it is desired that a aperture stop is arranged between the first lens group and a the second lens group, and the aperture stop is moved toward the same direction as the direction of movement of the second lens group to an image surface when magnification is performed.

In the two-group zoom lens according to the present invention, it is desired that a aperture stop is arranged between the first lens group and a the second lens group, and the aperture stop is moved toward the same direction as the direction of movement of the second lens group to an image surface when magnification is performed.

In the two-group zoom lens according to the present invention, it is desired that the aperture stop is arranged at the image side rather than the surface top of the lens of the second lens group, and the aperture size of the aperture stop is fixed, The electronic imaging apparatus of the present invention comprises the two-group zoom lens according to the present invention, and an electronic image pick-up element which is arranged at an image side and has a light receiving surface for converting a photographed subject image formed on an image pick-up surface by the two-group zoom lens to an electrical signal.

According to the present invention, it is possible to offer an electronic imaging device using the two-group zoom lens which is small and advantageous to simplification on a mechanism layout, while focusing from the infinite distance to the short distance can be performed.

These and other features and advantages of the present invention will become apparent from the following detailed description of the preferred embodiments when take in conjunction with the accompanying drawings.

BRIEF DESCRIPTION OF THE DRAWINGS

FIG. 1 is an explanatory diagram showing the first lens group (G1) in the case of moving a the first lens group (G1) for the amount of image position gap of the position of an actual light receiving surface, and the position of a preset image forming surface to an at the object side, and correcting an imaging position about a two-group zoom lens, and an optical path.

FIGS. 3A to 3D, 3E to 3H and 3I to 3L are aberration diagrams showing spherical aberration, astigmatism, distortion and chromatic aberration of magnification at the wide angle end, the middle position and the telephoto end respectively when focusing is performed at the infinite distance of the two-group zoom lens system in the first embodiment.

FIGS. 5A to 5D, 5E to 5H and 5I to 5L are aberration diagrams showing spherical aberration, astigmatism, distortion and chromatic aberration of magnification at the wide angle end, the middle position and the telephoto end respectively when focusing is performed at the infinite distance of the two-group zoom lens system in the first embodiment.

DETAILED DESCRIPTION OF THE PREFERRED EMBODIMENTS

Figure 2A:
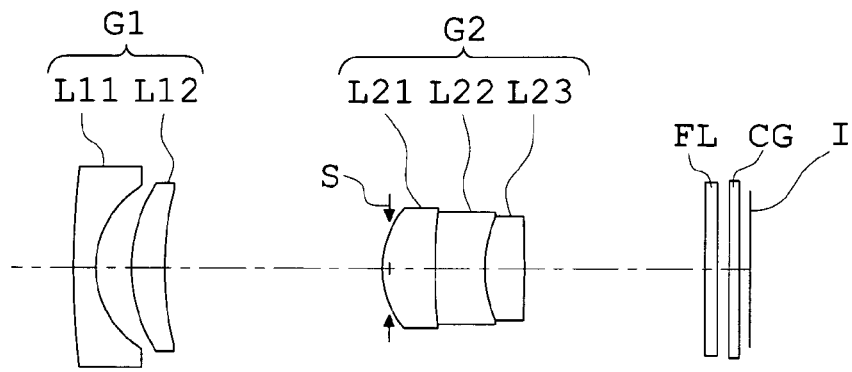
FIGS. 2A, 2B and 2C are sectional views showing an optical arrangement developed along the optical axis at the wide angle end, the middle position and the telephoto end respectively of the zoom lens system in a first embodiment according to the present invention.

Prior to explaining examples, reasons why the constitution of the present invention has been made as well as function and advantages according to the present invention will be explained.

In the present invention, it is premised on such constitution that magnification from a wide angle end to a telephoto end is performed by narrowing the interval between two lens groups, and focusing from focusing at the infinite object point to focusing at the short-distance object point is performed by moving the first lens group having negative refracting power toward the object side.

Here, when an electronic imaging apparatus is constituted, as shown in the present invention, such that the two-group zoom lenses which consist of the first lens group having negative refracting power and the second lens group having positive refracting power are used, an error occurs in fact and a shift of an image position is generated between a position which has been predetermined on an image forming surface and a position on an actual light receiving surface of an image sensor. Here, it is defined that an amount of shift of the image position between a position of the predetermined image forming surface and a position of the actual light receiving surface of the image sensor be an amount of the shift of the image position.

As to this amount of the shift of the image position, an explanation will be made by assuming a case that the shift becomes the same to a case at the wide angle end, and a case at the telephoto end. For example, when comparing a case that the shift of an image position is corrected by movement of the first lens group at the wide angle end, with a case that it is corrected by movement of the first lens group at the telephoto end, an amount of the movement of the image forming surface to an amount of the movement of the first lens group at the wide angle end is smaller than an amount of the movement of the image forming surface to an amount of the movement of the first lens group at the telephoto end.

That is, if correction of an amount of the shift of the image position between the predetermined image forming surface and a position of the actual light receiving surface of the image sensor is performed by moving the first lens group toward the object side, the amount of movement of the first lens group at the wide angle end becomes larger than that of the movement of the first lens group at the telephoto end.

Therefore, in case that a full length of zoom lens at the wide angle end and a full length of zoom lens at the telephoto end are the same, when the position of the actual light receiving surface has been shifted to the object side from the position of the predetermined image forming surface, if the shift of the image position is to be corrected by moving the first lens group toward the object side so that image forming may be performed at the position of the actual light receiving surface, the full length of zoom lens at the wide angle end will become longer than the full length of zoom lens at the telephoto end since an amount of movement of the the first lens group at the wide angle end is larger than that of movement of the first lens group at the telephoto end.

As to this point, it will be concretely explained by using FIG. 1.

For example, as shown in FIG. 1, in the two-group zoom lens which comprises in an order from the object side, the first lens group (G1) with negative refracting power, and the second lens group (G2) with positive refracting power, it is assumed that the full length of two-group zoom lens at the wide angle end (W) and the full length of two-group zoom lens at the telephoto end (T) are the same. Here, when magnification of the first lens group (G1) is performed toward the telephoto end (T) from the wide angle end (W), it is moved along a locus of convex shape toward the image side. A position of the first lens group (G1) and an optical path when image forming is performed on the predetermined image forming surface at the wide angle end (W) and the telephoto end (T) are shown. An optical path in this case is shown by a solid line.

The first lens group (G1) and an optical path when image forming is performed at a position of the actual light receiving surface which is shifted from the position of the predetermined image forming surface are shown. A dashed line shows the optical path at this time.

As shown in FIG. 1, when an image of luminous flux is formed on a predetermined image forming surface as shown by a solid line, depth magnification of the second lens group (G2) having positive refracting power at the middle position where the full length of the two-group of zoom lens becomes the shortest is set to 1.

The depth magnification $\alpha W$ of the second lens group (G2) having positive refracting power at the wide angle end (W) becomes smaller than 1.

The depth magnification $\alpha T$ of the second lens group (G2) having positive refracting power at the telephoto end (T) becomes $1/\alpha W$, which becomes larger than 1. (It is defined that the depth magnification is a ratio of the size of an image of an object formed on an axis, and size of the object it self, namely, as for the size ($\Delta Z$) of the object and the size ($\Delta Z'$) of the image is expressed by $\alpha=\Delta Z'/\Delta Z$, and the depth magnification becomes the square of lateral magnification.)

At this time, as shown in FIG. 1, it is assumed that the position of the actual light receiving surface is shifted by specified distance $\Delta i'$ to the object side from the position of the predetermined image forming surface.

Here, in case at the wide angle end (W), since the depth magnification of the second lens group (G2) having positive refracting power is $\alpha W$, when the position of the actual light receiving surface is shifted i toward the object side by $\Delta i'$ from the position of the predetermined image forming surface, a position which becomes conjugate of the center of the light receiving surface is a position which is shifted i by $\Delta i'/\alpha W$ from the conjugate point of the center of the predetermined image forming surface toward the object side.

Since the depth magnification of the second lens group (G2) having positive refracting power in case of the telephoto end (T) is $\alpha T$, when the position of the actual light receiving surface is shifted toward the object side by $\Delta i'$ from the position of the predetermined image forming surface, the position which becomes conjugate of the center of the light receiving surface is a position which is shifted by $\Delta i'/\alpha T$ from the conjugate point of the center of the predetermined image forming surface toward the object side.

Since the depth magnification of the second lens group (G2) becomes minimum in the case at the wide angle end (W), in case that the position of the actual light receiving surface is shifted toward the object side by $\Delta i'$ from the position of the predetermined image forming surface, an amount of shift of the position which is conjugate of the center of the light receiving surface and the position of the conjugate point of the center of the predetermined image forming surface becomes maximum, in case at the wide angle end (W).

Therefore, for the purpose of correcting the amount of shift of the image position $\Delta i'$ between the position of the actual light receiving surface and the position of the predetermined image forming surface, in order to carry out image forming of the luminous flux from the infinite object point on the position of the light receiving surface by moving the first lens group (G1) toward the object side, it is necessary to move the first lens group (G1) toward the object side by the amount of the shift between a position which is conjugate of the center of the light receiving surface and a position of the conjugate point of the center of the predetermined image forming surface.

In case at the wide angle end (W), the first lens group (G1) is to be moved by $\Delta i'/\alpha W$ toward the object side.

In case at the telephoto end (T), the first lens group (G1) is to be moved by $\Delta i'/\alpha T$.

At this time, an amount of movement of the first lens group (G1) becomes maximum, at the wide angle end (W), where the depth magnification of the second lens group (G2) becomes minimum.

Namely, when it is attempted that the full length of two-group zoom lens at the wide angle end (W) and the full length of two-group zoom lens at the telephoto end (T) are the same, and if the position of the actual light receiving surface is shifted by $\Delta i'$ to the object side from the position of the predetermined image forming surface, the amount of shift of an image position $\Delta i'$ is corrected by moving the first lens group (G1) toward the object side so that image forming may be performed at the position of the actual light receiving surface, In this case, since an amount of movement of the first lens group (G1) at the wide angle end (W) is longer than that of movement of the first lens group (G1) at the telephoto end (T), the full length of the two-group zoom lens at the wide angle end (W) becomes longer than the full length of the two-group zoom lens at the telephoto end (T), Therefore, it becomes necessary to prepare a large lens holding body tube beforehand by foreseeing an amount of movement of the first lens group (G1) in order to correct the amount of shift of the image position Δi' by moving the first lens group (G1) toward the object side.

Accordingly, in the present invention, it is constituted such that the length of the full length of the zoom lens at the telephoto end becomes somewhat longer than the length of the full length of the zoom lens at the wide angle end. Thus, even when the first lens group is moved toward the object side in order to correct an amount of the shift of the image position generated by manufacture error or temperature humidity change, the full length of zoom lens when the first lens group is moved toward the object side at the wide angle end and the full length of zoom lens when the first lens group is moved toward the object side at the telephoto end can be made almost the same. In this way, since the lens holding body tube can be constituted according to this length, the lens holding body tube can be made small as much as possible.

Furthermore, the present invention is characterized in that the following conditions (1) to (4) are satisfied simultaneously.

Condition (1) is the condition for balancing the size of the first lens group and the second lens group, wherein the focal length (inverse of power) of the first lens group is defined by the middle focal length (geometric mean of a wide-angle-end focal length and a telephoto-end focal length) of the whole system of the zoom lens.

$$0.930 < |f_1|/\sqrt{(f_w \cdot f_T)} < 0.990 \quad (1)$$

where $f_1$ is a focal length of the first lens group, $f_w$, is a focal length of the whole system of the two-group zoom lens when the infinite distance focusing is performed at the wide angle position, and $f_T$ is a focal length of the whole system of the two-group zoom lens when the infinite distance focusing is performed at the telephoto end position.

If the value of $|f1|/\sqrt{(f_w \cdot f_T)}$ exceeds the maximum of condition (1), the interval between lens-groups at the wide angle end becomes large, and an effective diameter of the first lens group becomes large for keeping the luminous flux at the wide angle end.

Therefore, it is not desirable because it becomes disadvantageous for miniaturization including a frame when focusing is performed by moving the first lens group.

On the other hand, if the value of $|f_1|/\sqrt{(f_w \cdot f_T)}$ is less than the minimum of condition (1), it is not desirable since the effective diameter of the second lens group to the F number in magnification range becomes large and the diameter of the lens holding body tube becomes easily large.

In the present invention, it is desired that the maximum value of condition (1) is set to 0.985. Further, it is more desirable to set the maximum value to 0.980.

In the present invention, it is desired that lower limit of condition (1) is set to 0.940. Furthermore, it is more desirable to set the lower limit to 0.950.

Condition (2) specifies a ratio of actual distances from the surface top nearest to the object side to the image forming surface of the first lens group when focusing at the infinite distance is performed at the wide angle end and at the telephoto end.

$$L_T/L_W > 1 \quad (2)$$

where Lw is an actual distance from the surface top nearest to the object side to the image forming surface of the first lens group when focusing is performed at the wide angle end. LT is an actual distance from the surface top nearest to the object side to the image forming surface of the first lens group when focusing is performed at the telephoto end.

When correction of the shift of the imaging position generated by the manufacture error is performed by movement of the first lens group, taking into consideration of the amount of correction, it is desired that the full length at the telephoto end is made to become the maximum for making the maximum full length of an optical system small. By such arrangement, moving range of the first lens group at the telephoto end can be made easy to secure.

If the value of $L_T/L_W$ is less than the minimum of condition (2), it is not desirable since a range which can be adjusted by movement of the first lens group becomes small when securing of the magnification ratio is required, because it is not at the telephoto end when the full length becomes the maximum Further, it is not desirable that since the diameter of the first lens group tends to become large easily and an off-axitial aberration is easily generated, since it is at the wide angle end when the full length becomes the maximum In the present invention, it is desired that the minimum value of condition (2) is set to 1.005. Furthermore, it is more desirable to set the lower limit to 1.01.

If the difference between the full length at the wide angle end and the telephoto end becomes large too much, the magnification ratio becomes smaller in comparison with the moving range of the first lens group. Therefore, in the present invention, it is desirable to prepare a certain maximum value in condition (2) and to set the maximum value to 1.07. Furthermore, it is more desirable to set the maximum value to 1.05.

Therefore, in the present invention, it is desirable to prepare a certain maximum value in condition (2) and to set the maximum value to 1.07.

Furthermore, it is more desirable to set the maximum value to 1.05.

Condition (3) specifies a relation between the magnification at the wide angle end of the second lens group and the magnification ratio of the whole system of the zoom lens.

$$1.0 < (\beta_{2w})^2 \times f_T/f_w < 1.20 \quad (3)$$

where $f_w$ is the focal length of the whole system of the two-group zoom lens when focusing of the infinite distance at the wide angle end is performed, $f_T$ is the focal length of the whole system of the two-group zoom lens when focusing of the infinite distance at the telephoto end is performed, and $\beta_{2w}$ is a lateral magnification of the second lens group when focusing to the object point of the infinite distance at the wide angle end is performed, A magnification ratio of the whole system of the zoom lens is a ratio of the magnification composed by the second lens group and the other lens groups after the second lens group.

Therefore, when the lateral magnification of the magnification composed by lens groups after the second lens group when focusing of the infinite distance is performed at the telephoto end is set $\beta_T$, and the lateral magnification of the magnification composed by lens groups after the second lens group when focusing of the infinite distance is performed at the wide angle end is set $\beta_w$, the magnification ratio of the whole system of the zoom lens is expressed by the following condition.

$$\beta_T/\beta_w$$

When the lateral magnification of the magnification composed by the lens groups after the second lens group when focusing of the infinite distance at the telephoto end is βT, and the lateral magnification of the magnification composed by the lens groups after the second lens group when focusing of the infinite distance at the wide angle end is βT.

And when the zoom lens is constituted by two lens groups, the magnification ratio of the second lens group becomes the magnification ratio of the whole system of the two-group zoom lens.

Therefore, where lateral magnification of the magnification composed by the lens groups after the second lens group when focusing of the infinite distance is performed at the telephoto end is β2T, and the lateral magnification of the magnification composed by the lens groups after the second lens group when focusing of the infinite distance is performed at the wide angle end is β2w, the magnification ratio of the whole system of the two-group zoom lens can be expressed by the following condition.

$$\beta_{2T}/\beta_{2w}$$

Thus, the magnification ratio of the whole system of the zoom lens can be expressed by the following condition.

$$f_T/f_w = \beta_{2T}/\beta_{2w}$$

As mentioned above, the ratio between the focal length fT of the whole system of the two-group zoom lens when focusing at the infinite distance at the telephoto end is performed, and the focal length fW of the whole system of the two-group zoom lens when focusing at the infinite distance at the wide angle end is performed, can be expressed by replacing the relation of the ratio between the lateral magnification β2T of the second lens group when focusing at the infinite distance at the telephoto end is performed and the lateral magnification β2w of the second lens group when focusing at the infinite distance at the wide angle end is performed.

Accordingly, condition (3) can be expressed also by converting to the following condition (3-1),which is expressed by the product of the lateral magnification $\beta_{2w}$ of the second lens group when focusing at the infinite distance at the wide angle end is performed, and the lateral magnification $\beta_{2T}$ of the second lens group when focusing at the infinite distance at the telephoto end is performed.

$$1.0 < \beta_{2T} \times \beta_{2w} < 1.20 \tag{3-1}$$

When the value of $(\beta_{2w})^2 \times f_T/f_w$ exceeds the maximum of condition (3), the magnification by the second lens group becomes large, and accordingly, sensitivity of the performance degradation due to eccentricity of the first lens group and the second lens group becomes large.

On the other hand, it is not desirable if the value of $(\beta_{2w})^2 \times f_T/f_w$ is less than the minimum of condition (3), the magnification of the second lens group becomes small, and due to securing the luminous flux at the wide angle end, or aberration compensation, the first lens group tends to be large and thick, and therefore, it becomes disadvantageous for miniaturization.

In the present invention, it is desired that the maximum value of condition (1) is set to 1.15. Furthermore, it is more desirable to set the maximum value 1.10.

In the present invention, it is desired that lower limit of condition (3) is set to 1.03.

Furthermore, it is more desirable to set the lower limit to 1.05. Condition (4) specifies the lateral magnification at the telephoto end of the second lens group.

$$1.2 < |\beta_{2T}| < 5 \tag{4}$$

where $\beta_{2T}$ is the magnification of the second lens group when focusing to the object point of the infinite distance at the telephoto end is performed.

It is not desirable if the value of $|\beta_{2T}|$ exceeds the maximum of condition (4), since the lateral magnification of the second lens group at the telephoto end becomes large too much, and aberration due to manufacture error of the first lens group is expanded by the second lens group and the influence on the aberration becomes large. Further, it is not desirable since an amount of movement of the second lens group becomes large, accordingly it is disadvantageous for miniaturization, or the refracting power of the second lens group becomes too strong, or the refracting power of the second lens group becomes strong too much and accordingly correction of aberration in the second lens group becomes difficult.

On the other hand, it is not desirable if the value of $|\beta_{2T}|$ is less than the minimum of condition (4) since it becomes impossible to secure a moderate magnification ratio.

In the present invention, it is desirable that the maximum value of condition (4) is set to 3.0. Furthermore, it is more desirable to set the maximum value to 2.0.

Moreover, in the present invention, it is desired that lower limit of condition (4) is set to 1.3. Furthermore, it is more desirable to set the lower limit to 1.5.

For example, as for condition (4), it is more desirable to satisfy the following condition (4-1).

$$1.5 < |\beta_{2T}| < 3.0 \tag{4-1}$$

If it is constituted such that the aspherical surface nearest to the image surface side among two or more aspherical surfaces of the second lens group in the present invention has different signs of curvature at a center of the optical axis and its circumference, since the on-axial luminous flux and the off-axial luminous flux of the second lens group are separated moderately, the correction effect by the on-axial luminous flux and the correction effect by the off-axial luminous flux at the image side of the second lens group can be obtained individually.

Moreover, corrections of coma aberration and astigmatism can be performed well.

In the present invention, if it is constituted to have an aspherical surface where positive refracting power becomes weaker as the second lens group is departed from the optical axis toward the object side, and an aspherical surface having different signs of curvature at the center of the optical axis and at its circumferential portion at the most image surface side, generation of aberrations in the second lens group can be suppressed as much as possible, and accordingly, spherical aberration, coma aberration, and astigmatism can be corrected with sufficient balance from the infinite-distance-focusing state to a very near distance focusing state as well as from the wide angle end to the telephoto end.

If the aspherical surfaces mentioned above is arranged in the second lens group, even in case that the second lens group is constituted by one lens component consisting of a single lens or a cemented lens which has only two air contact surfaces at the most object side or at the most image side within an effective diameter, the aberration can be fully corrected. Consequently, the whole mirror holder can be miniaturized much more.

Further, in such constitution of the second lens group as mentioned above, if a surface nearest to the object side and a surface nearest to the image side of one lens component which consist of the single lens or the cemented lens are formed to be aspherical surfaces, the effect of correction of aberration by the aspherical surface can fully be acquired.

Furthermore, in such constitution of the second lens group as mentioned above, if a lens component of the second lens group is constituted with one cemented lens, correction of aberrations including chromatic aberration can be performed advantageously.

Furthermore, in the second lens group as mentioned above, if the lens component of the second lens group is constituted such that one cemented lens consists of three lenses, in which in order from the object side, a positive lens, a negative lens, and a positive lens are arranged, and the surface nearest to the object side and the surface nearest to the image side of the cemented lens are made to have a form where a convex surface is directed toward the space side on the optical axis, respectively, correction of various type of aberrations can be well performed, while keeping a required positive refracting power in the second lens group.

In the present invention, if the first lens is constituted such that in order from the object side, a negative lens component having a concave surface directed toward the image surface side and a positive meniscus lens component having a convex surface directed toward the object side are arranged, and the negative lens component having the concave surface directed toward the image surface side, and the positive meniscus component having the convex surface directed toward the object side are constituted by a single lens or a cemented lens which has only two surfaces as air contact surfaces at the most object side and at the most image side within an effective diameter, thinning of the first lens group can be achieved since the number of lens sheets consisting of the first lens group can be small.

In the present invention, if the first lens group is constituted with the cemented lens as mentioned above, the first lens group can be easily miniaturized relatively since a principal point is positioned near the object side.

In the present invention, if the first lens group is constituted with lens components having different refracting powers, respectively, generating of chromatic aberration can be suppressed.

Furthermore, in the first lens group as mentioned above, if as for the concave surface of the negative lens component of the first lens group in which a concave surface is directed toward the image surface side, the absolute value of paraxial radius of curvature is set to the minimum among the lens surfaces contacted with air in the first lens group, generation of an off axial aberration can be made small since the angle of incidence over the off-axial luminous flux at the wide angle side of the negative lens component in which the concave surface is directed toward to the image surface side becomes small Moreover, generation of aberrations can be suppressed by the positive meniscus component having a convex surface directed toward the object side in the first lens group.

In the present invention, if an aperture stop is arranged between the first lens group and the second lens group, it becomes easy to keep size balance of the first lens group and the second lens group which are located before or after the aperture stop. For example, if the aperture stop is close to the image surface, the incident height of the off-axial ray to the first lens group becomes high at the wide angle side, and the diameter of the first lens group becomes larage. On the other hand, if the aperture stop is close to the object side, the incident height of the off-axial ray to the second lens group becomes high, and accordingly, it becomes difficult to suppress aberrations in the second lens group in which refracting power tends to become strong.

In the present invention, if the aperture stop having a fixed aperture size is arranged nearer to a position of the image side rather than the top of the incidence surface of the second lens group, it is advantageous to shortening further a distance between the first lens group and the second lens group at the telephoto end.

In the present invention, if the aperture stop having a fixed size is arranged as mentioned above, in the two-group zoom lens like the present invention which comprises in order from the object side, the first lens group having negative refracting power and the second lens group having positive refracting power, the magnification ratio of the zoom lens by accompanying with movement of the second lens group can be enlarged much more since it is possible to shorten much further a distance between the first lens group and the second lens group at the telephoto end.

Therefore, according to the two-group zoom lens of the present invention, telecentric nature at an exit side of the aperture stop can be secured easily and incident light to an image sensor can be close to vertical. Therefore, according to the two-group zoom lens of the present invention, it can be used by being equipped in an electronic imaging apparatus, such as a digital camera and a video camera, which has an electronic image pick-up element having a light receiving surface for converting a photographic subject image formed on the image pick-up surface to an electric signal.

According to the two-group zoom lens of the present invention, an imaging apparatus that is small and advantageous to simplification on mechanism layout, while performing focusing from the infinite distance to a short distance can be offered.

Hereafter, the first embodiment and the second embodiment of the two-group zoom lens according to the present invention will be explained using drawings.

First Embodiment

FIG. 2 shows sectional views showing optical arrangements developed along the optical axis of the two-group zoom lens in a first embodiment according to the present invention.

Figure 2B:
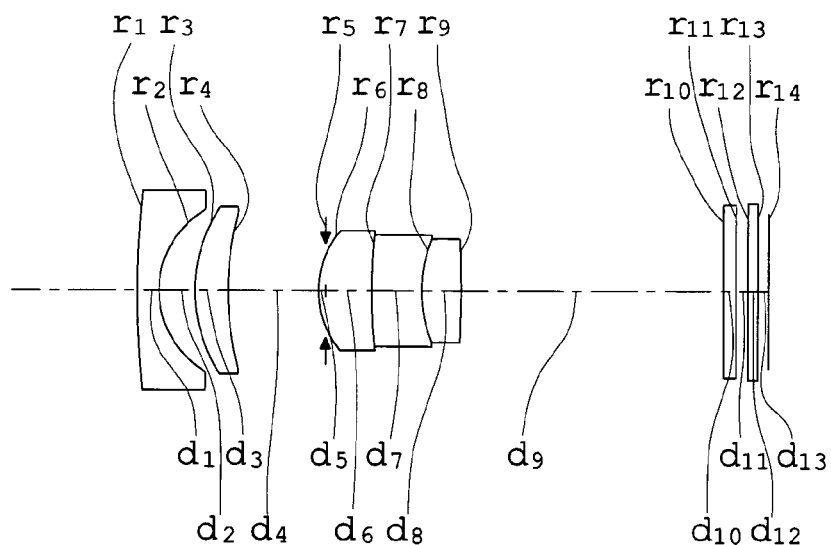
Figure 2C:
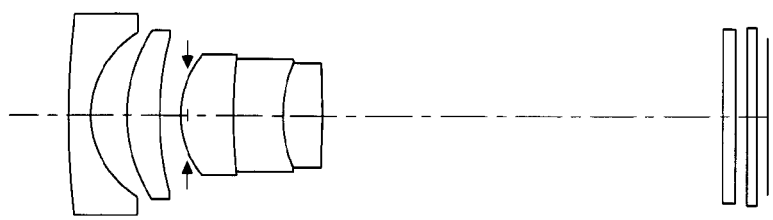

FIG. 2A, FIG. 2B and FIG. 2C are sectional views showing states at a wide-angle-end, a middle position and a telephoto end, respectively.

FIG. 3 shows aberration diagrams showing spherical aberration, astigmatism, distortion and chromatic aberration of magnification when focusing is performed at the infinite distance focusing of the two-group zoom lens in the first embodiment. That is, FIG. 3A, FIG. 3B, FIG. 3C, and FIG. 3D are aberration diagrams showing aspherical aberration, astigmatism, and chromatic aberration of magnification at the wide angle end. FIG. 3E, FIG. 3F, FIG. 3G, and FIG. 3H are aberration diagrams showing spherical aberration, astigmatism, distortion and chromatic aberration of magnification at the middle position, respectively. FIG. 3I, FIG. 3J, FIG. 3K, and FIG. 3L are aberration diagrams showing spherical aberration, astigmatism, distortion, and chromatic aberration of magnification, at the telephoto end.

The two-group zoom lens of the first embodiment of the present invention is constituted that in order from the object side toward an image pick-up surface I, a first lens group G1 having negative refracting power, and a second lens group G2 having positive refracting power, as shown in FIG. 2.

In the Figure, S is an aperture stop, FL is a plane parallel plate, such as a low pass filter and an infrared absorption filter, CG is a cover glass, and I is the image pick-up surface of an image sensor (CCD, CMOS, etc.).

The first lens group G1 comprises, a negative meniscus lens L11 having a concave surface directed toward the image surface side, and a positive meniscus lens L12 having a convex surface directed toward the object side, and an air space between the lenses L11 and L12.

The first lens group G1 has negative refracting power as a whole. In addition, the surface at the image surface side of the negative meniscus lens L11 having the concave surface directed toward the image surface side is constituted such that an absolute value of paraxial radius of curvature becomes the smallest among those of the lens surfaces contacted with air in the first lens group.

The second lens group G2 comprises a cemented lens in which in order from the object side, a positive meniscus lens L21 having a concave surface directed toward the image surface side, a negative meniscus lens L22 having a concave surface directed toward the image surface side and a positive lens L23 having biconvex surfaces near the optical axis (center portion of lens) are arranged, and it has positive refracting power as a whole.

The surface at the object side of the positive meniscus lens L21 having a concave surface directed toward the image surface side is constituted such that positive refracting power becomes weaker gradually from a center portion to a circumferential portion of the lens. The surface of the positive lens L23 having biconvex surfaces at the portion near the optical axis (center portion of the lens) is constituted such that the signs of curvatures are different at the center of the optical axis and its circumferential portion.

Aspherical surfaces are formed on the image side surface of the negative meniscus lens L11 having a concave surface directed toward the image surface side of the first lens group G1, the object side surface of the positive meniscus lens L21 having a concave surface directed toward the image surface side of the first lens group G2, and at the image surface side of the positive lens L23 having biconvex surfaces near the optical axis (center portion of the lens), respectively.

When magnification from the wide angle end (FIG. 2A) to the telephoto end (FIG. 2C) is performed, the first lens group G1 is moved toward the image side along locus of a convex form, and at the telephoto end (FIG. 2C) rather than the wide angle end (FIG. 2A), it is moved so that the full length of zoom lens may become longer a little, and the second lens group G2 is moved from the image-pick-up-surface I to at the object side, respectively. When focusing from focusing at the infinite-object-point to focusing at a very near object position, the first lens group G1 is moved toward the object side.

At this time, the interval $d_4$ between the first lens group G1 and the aperture stop S connected to the second lens group G2 decreases, and each lens group is moved so that the interval $d_9$ between the second lens group G2 and the plane parallel plate FL may increase. In addition, the image pick-up surface I is arranged on diagonal direction of effective imaging of CCD or CMOS sensor.

Next, numerical data of optical elements composing the zoom lens system of the first embodiment are shown.

In the numerical data $r_1$, $r_2$, . . . denote radii of curvature (mm) of individual lens surfaces; $d_1$, $d_2$ . . . denote thickness (mm) of individual lenses or air space(mm) between them; $n_{d1}$, $n_{d2}$ . . . denote refractive indices of individual lenses at the d line (587.6 nm); $v_{d1}$, $v_{d2}$, . . . denote Abbe's numbers of individual lenses at the d line (587.6 nm); f denotes the total focal length of the zoom lens system.

When z is taken as the coordinate in the direction of the optical axis, y is taken as the coordinate orthogonal to the optical axis, x is taken as the coordinate in the direction orthogonal to z and y, k represents a conic constant, and $A_4$, $A_6$, $A_8$, $A_{10}$ represent aspherical coefficients, the configuration of each of the aspherical surfaces is expressed by the following equation.

$$z=(y^2/r)/[1+\{1-(1+k)(y/r)^2\}^{1/2}]+A_4y^4+A_6y^6+A_8y^8+A_{10}y^{10}$$

These symbols are commonly used in the second embodiment to be described later.

Numerical Data 1

An image height (the length of a half of the diagonal length of an effective image forming area): 3.82 mm Focal length f: 5.952 mm~17.097 mm
Fno.(F number): 3.26-5.70
(In the following data, APS represents "aspherical surface")

| | | | |
|---|---|---|---|
| $r_1 = 46.387$ | $d_1 = 1.00$ | $n_{d1} = 1.80610$ | $v_{d1} = 40.92$ |
| $r_2 = 3.854$ (APS) | $r_2 = 1.77$ | | |
| $r_3 = 7.382$ | $d_3 = 1.62$ | $n_{d3} = 1.84666$ | $v_{d3} = 23.78$ |
| $r_4 = 17.384$ | $d_4 = D_4$ (variable) | | |
| $r_5 = \infty$ (aperture stop) | $d_5 = -0.26$ | | |
| $r_6 = 4.855$ (APS) | $d_6 = 2.52$ | $n_{d6} = 1.58313$ | $v_{d6} = 59.38$ |
| $r_7 = 37.142$ | $d_7 = 2.32$ | $n_{d7} = 1.84666$ | $v_{d7} = 23.78$ |
| $r_8 = 6.503$ | $d_8 = 1.93$ | $n_{d8} = 1.51633$ | $v_{d8} = 64.14$ |
| $r_9 = -15.584$ (APS) | $d_9 = D_9$ (variable) | | |
| $r_{10} = \infty$ | $d_{10} = 0.50$ | $n_{d10} = 1.54771$ | $v_{d10} = 62.84$ |
| $r_{11} = \infty$ | $d_{11} = 0.60$ | | |
| $r_{12} = \infty$ | $d_{12} = 0.50$ | $n_{d12} = 1.51633$ | $v_{d12} = 64.14$ |
| $r_{13} = \infty$ | $d_{13} = 0.53$ | | |
| $r_{14} = \infty$ (image surface) | | | | aspherical data

| Surface no. | k | $A_4$ | $A_6$ | $A_8$ | $A_{10}$ |
|---|---|---|---|---|---|
| 2 | −0.766 | $3.15109 \times 10^{-4}$ | $-1.45250 \times 10^{-7}$ | $6.20761 \times 10^{-9}$ | $-1.86943 \times 10^{-9}$ |
| 6 | −3.522 | $3.33417 \times 10^{-3}$ | $-1.26709 \times 10^{-4}$ | $9.03084 \times 10^{-6}$ | $-3.57915 \times 10^{-7}$ |
| 9 | −36.821 | $8.56370 \times 10^{-4}$ | $2.19507 \times 10^{-4}$ | $-7.65093 \times 10^{-6}$ | $2.14774 \times 10^{-6}$ |

-continued

Zoom data 1

| | wide angle end | middle position | telephoto end |
|---|---|---|---|
| f | 5.952 | 10.088 | 17.097 |
| Fno. | 3.26 | 4.16 | 5.70 |
| total field angle (2ω) | 64.5° | 39.7° | 23.8° |
| $D_4$ | 10.80 | 4.80 | 1.26 |
| $D_9$ | 8.64 | 12.53 | 19.13 |

Second Embodiment

Figure 4A:
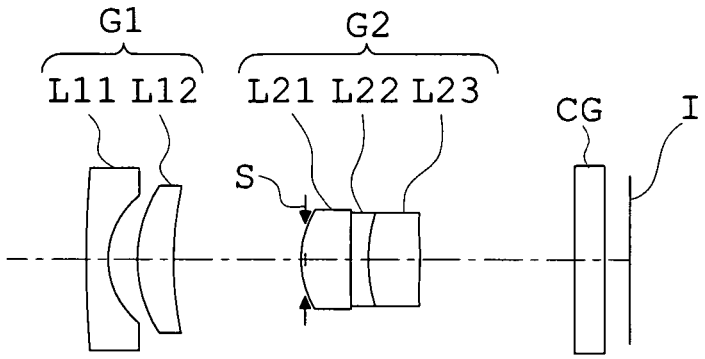
FIGS. 4A, 4B and 4C are sectional views showing an optical arrangement developed along the optical axis at the wide angle end, the middle position and the telephoto end respectively of the zoom lens system in a first embodiment according to the present invention.
Figure 4B:
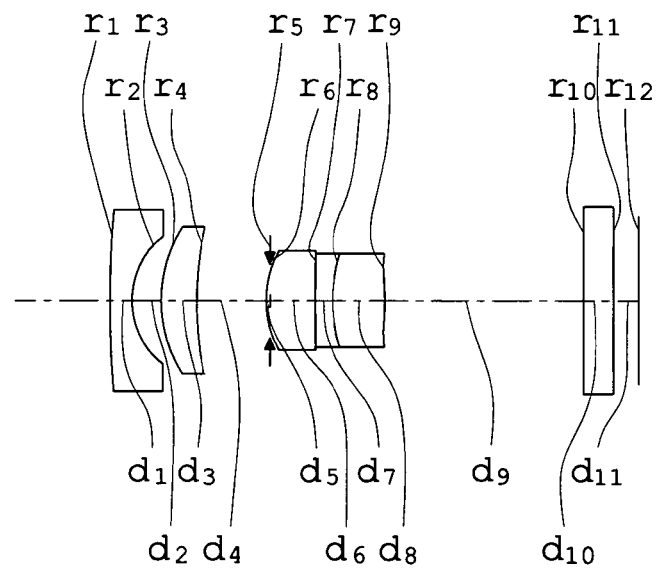
Figure 4C:
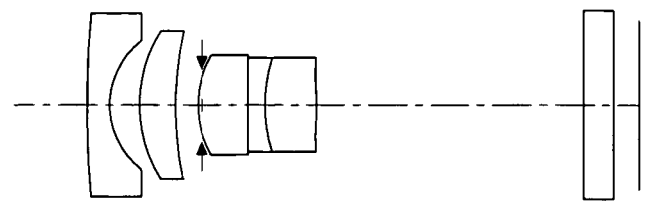

FIG. 4 shows sectional views showing optical arrangements developed along the optical axis of the two-group zoom lens in a second embodiment according to the present invention.

FIG. 4A, FIG. 2B and FIG. 2C are sectional views showing states at a wide-angle-end, a middle position and a telephoto end, respectively.

FIG. 5 is a diagram showing aberrations when focusing at the infite distance of the two-group zoom lens according to the 2nd embodiment. Namely, FIG. 5A, FIG. 5B, FIG. 5C, FIG. and 5D are aberration diagrams showing spherical aberration, astigmatism, distortion and chromatic aberration of magnification at the wide angle end. FIG. 5E, FIG. 5F, FIG. 5G and 5H are aberration diagrams showing spherical aberration, astigmatism, distortion and chromatic aberration of magnification at the middle position. FIG. 5I FIG. 5J, FIG. 5K and 5L are aberration diagrams showing spherical aberration, astigmatism, distortion and chromatic aberration of magnification at the telephoto end.

The two-group zoom lens of the second embodiment of the present invention is constituted that in order from the object side toward an image pick-up surface I, a first lens group G1 having negative refracting power, and a second lens group G2 having positive refracting power, as shown in FIG. 4. In the FIG. 4, S is an aperture stop, CG is a plane parallel plate which is constituted by material equivalent to what is composed by cover glass of an image pick-up element and a low pass filter with IR cutting coat surfaces, such as a low pass filter and an infrared absorption filter, and I is an image pick-up surface of an image pick-up elements (CCD, CMOS, etc.).

The first lens group G1 comprises, a negative meniscus lens L11 having a concave surface directed to the image surface side, and a positive meniscus lens L12 having a convex surface directed toward the object side, and an air space between the lenses L11 and L12. It has negative refracting power as a whole. The surface at the image surface side of the negative meniscus lens L11 having the concave surface directed to the image surface side is constituted such that an absolute value of paraxial radius of curvature becomes the smallest among the lens surfaces contacted with air in the first lens group.

The second lens group G2 comprises a cemented lens in which in order from the object side, a positive meniscus lens L21 having a concave surface directed toward the image surface side, a negative meniscus lens L22 having a concave surface directed to the image surface side and a positive lens L23 having biconvex surfaces near the optical axis (center portion of lens) are arranged, and it has positive refracting power as a whole.

The surface at the object side of the positive meniscus lens L21 having a concave surface directed toward the image surface side is constituted such that positive refracting power becomes weaker gradually from a center portion to a circumferential portion of the lens. The surface of the positive lens L23 having biconvex surfaces at the portion near the optical axis (center portion of the lens) is constituted such that the signs of curvature are different at the center of the optical axis and its circumferential portion.

Aspherical surfaces are formed on the image side surface of the negative meniscus lens L11 having a concave surface directed to the image surface side of the first lens group G1, the object side surface of the positive meniscus lens L21 having a concave surface directed toward the image surface side of the first lens group G2, and at the image surface side of the positive lens L23 having biconvex surfaces near the optical axis (center portion of the lens), respectively.

When magnification from the wide angle end (FIG. 4A) to the telephoto end (FIG. 4C) is performed, the first lens group G1 is moved toward the image side along locus of a convex form, and at the telephoto end (FIG. 4C) rather than the wide angle end (FIG. 4A) it is moved so that the full length of zoom lens may become longer a little, and the second lens group G2 is moved from the image-pick-up-surface I toward the object side, respectively.

When focusing from focusing at the infinite-object-point to focusing at a very near object position is performed, the first lens group G1 is moved toward the object side.

At this time, the interval d4 between the first lens group G1 and the aperture stop S connected to the second lens group G2 decreases, and each lens group is moved so that the interval d9 between the second lens group G2 and the plane parallel plate CG may increase. Here, the image pick-up surface I is arranged on diagonal direction of effective imaging of CCD or CMOS sensor.

Next, numerical data of optical elements composing the zoom lens system of the second embodiment are shown.

Numerical Data 2

An image height (the length of a half of the diagonal length of an effective image forming area): 3.92 mm Focal length f: 5.916 mm-11.479 mm
Fno. (F number): 3.59-5.07

| | | | |
|---|---|---|---|
| $r_1 = 76.650$ | $d_1 = 1.00$ | $n_{d1} = 1.80610$ | $\nu_{d1} = 40.92$ |
| $r_2 = 3.276$ (APS) | $d_2 = 1.40$ | | |
| $r_3 = 6.251$ | $d_3 = 1.70$ | $n_{d3} = 1.84666$ | $\nu_{d3} = 23.78$ |
| $r_4 = 16.782$ | $d_4 = D_4$ (variable) | | |
| $r_5 = \infty$ (aperture stop) | $d_5 = -0.20$ | | |
| $r_6 = 4.384$ (APS) | $d_6 = 2.30$ | $n_{d6} = 1.69350$ | $\nu_{d6} = 53.21$ |
| $r_7 = 300.000$ | $d_7 = 0.80$ | $n_{d7} = 1.84666$ | $\nu_{d7} = 23.78$ |
| $r_8 = 6.297$ | $d_8 = 2.40$ | $n_{d8} = 1.48749$ | $\nu_{d8} = 70.23$ |
| $r_9 = -13.015$ (APS) | $d_9 = D_9$ (variable) | | |
| $r_{10} = \infty$ | $d_{10} = 1.30$ | $n_{d10} = 1.51633$ | $\nu_{d10} = 64.14$ |
| $r_{11} = \infty$ | $d_{11} = 1.23$ | | |
| $r_{12} = \infty$ (image surface) | | | | aspherical data

| Surface No. | k | A4 | A6 | A8 | A10 |
|---|---|---|---|---|---|
| 2 | −1.130 | $1.83732 \times 10^{-3}$ | $-2.30469 \times 10^{-5}$ | $4.01044 \times 10^{-6}$ | $-1.91354 \times 10^{-7}$ |
| 6 | −0.345 | $-5.98870 \times 10^{-5}$ | $6.13929 \times 10^{-6}$ | $-2.96420 \times 10^{-6}$ | $8.00000 \times 10^{-7}$ |
| 9 | 0.000 | $4.16180 \times 10^{-3}$ | $9.37500 \times 10^{-5}$ | $6.17499 \times 10^{-5}$ | $1.48794 \times 10^{-7}$ |

Zoom data 2

| | wide angle end | middle position | telephoto end |
|---|---|---|---|
| f | 5.916 | 7.988 | 11.479 |
| Fno. | 3.59 | 4.14 | 5.07 |
| total field angle (2ω) | 65.5° | 49.6° | 35.1° |
| $D_4$ | 6.09 | 3.53 | 1.30 |
| $D_9$ | 7.12 | 8.99 | 12.14 |

In each embodiment mentioned above, it is assumed that a light receiving surface is arranged at a predetermined-image-forming-surface position of the two-group zoom lens.

However, when the position of an actual light receiving surface is shifted to the object side from the position of the predetermined image forming surface, an amount of extension of the first lens group for image position adjustment at the wide angle end becomes larger than that at the telephoto end.

In each embodiment mentioned above, it is foreseen that an amount of extension of the first lens group for image position adjustment at the wide angle end becomes larger than that at the telephoto end, and it is set that the full length if the lens at the telephoto end becomes longer than that at the wide angle end.

In each embodiment mentioned above, it is constituted such that when in the two-group zoom lens of the present invention, magnification is performed from the wide angle end to the telephoto end, the first lens group G1 is moved toward the image side along locus of a convex form, and the second lens group G2 is moved from the image-pick-up-surface I to at the object side, respectively, and when focusing is performed from focusing at the infinite-object-point to focusing at a very near object position, the first lens group G1 is moved toward at the object side. However, as an operation at the time of actual magnification, it is possible to constitute such that firstly, after fixing the first lens group G1 at a position corresponding to a position when focusing at the infite object point is performed at the telephoto end, a focal length is adjusted by moving the second lens group G2, and then, by linking to operation of focusing at the time of photographing (operation of pushing a shutter button), the first lens group G1 is moved so as to get good focusing condition on the light receiving surface.

In each embodiment mentioned above, all the lenses constituting the two-group zoom lens are a homogeneous medium. However, it is possible to use any lenses having diffraction lens surface and refracting index distribution type lens.

Next, values corresponding to the conditions in each embodiment mentioned above are shown in the following Table 1.

TABLE 1

| Parameters in the embodiment | The first embodiment | The second embodiment |
|---|---|---|
| $f_1$ | −9.62 | −8.038 |
| $f_w$ | 5.952 | 5.916 |
| $f_T$ | 17.097 | 11.479 |
| $L_T$ | 33.4106 | 25.3583 |
| $L_W$ | 32.47 | 25.12 |
| $\beta_{2w}$ | −0.619 | −0.736 |
| $\beta_{2T}$ | −1.428 | −1.777 |
| $|f_1|/\sqrt{(f_w \cdot f_T)}$ | 0.954 | 0.975 |
| $L_T/L_W$ | 1.029 | 1.010 |
| $(\beta_{2w})^2 \times f_T/f_w$ | 1.099 | 1.051 |
| $|\beta_{2T}|$ | 1.428 | 1.777 |

As explained above, the electronic imaging apparatus using the two-group zoom lens according to the present invention can be used in a photographing apparatus in which an object image is formed and is received by a solid-state image sensor, such as CCD, and thereby photographing is performed by using the two-group zoom lens., especially in a digital camera, a video camera, a personal computer as an example of information processing equipment, a telephone, a cellular phone which is useful for carrying and the like.

Aspects of the two-group zoom lens mentioned above will be illustrated below.

Figure 6:
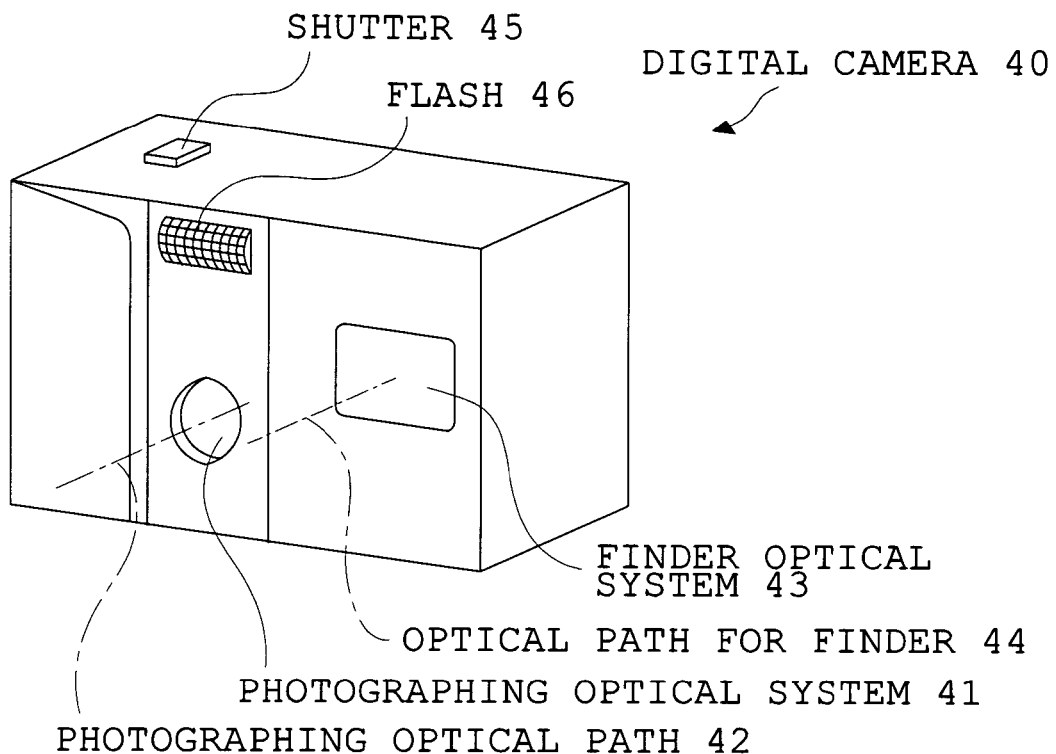
FIG. 6 is a front perspective diagram showing the outside view of an electronic camera which two-group zoom lens of the present invention is applied.
Figure 7:
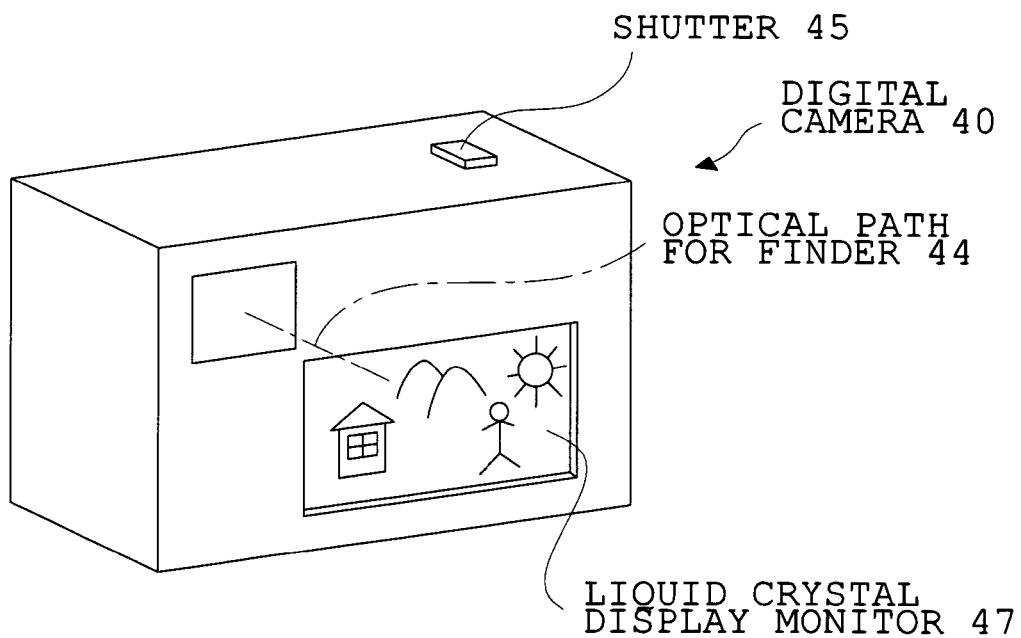
FIG. 7 is a back perspective diagram of the digital camera of FIG. 6.
Figure 8:
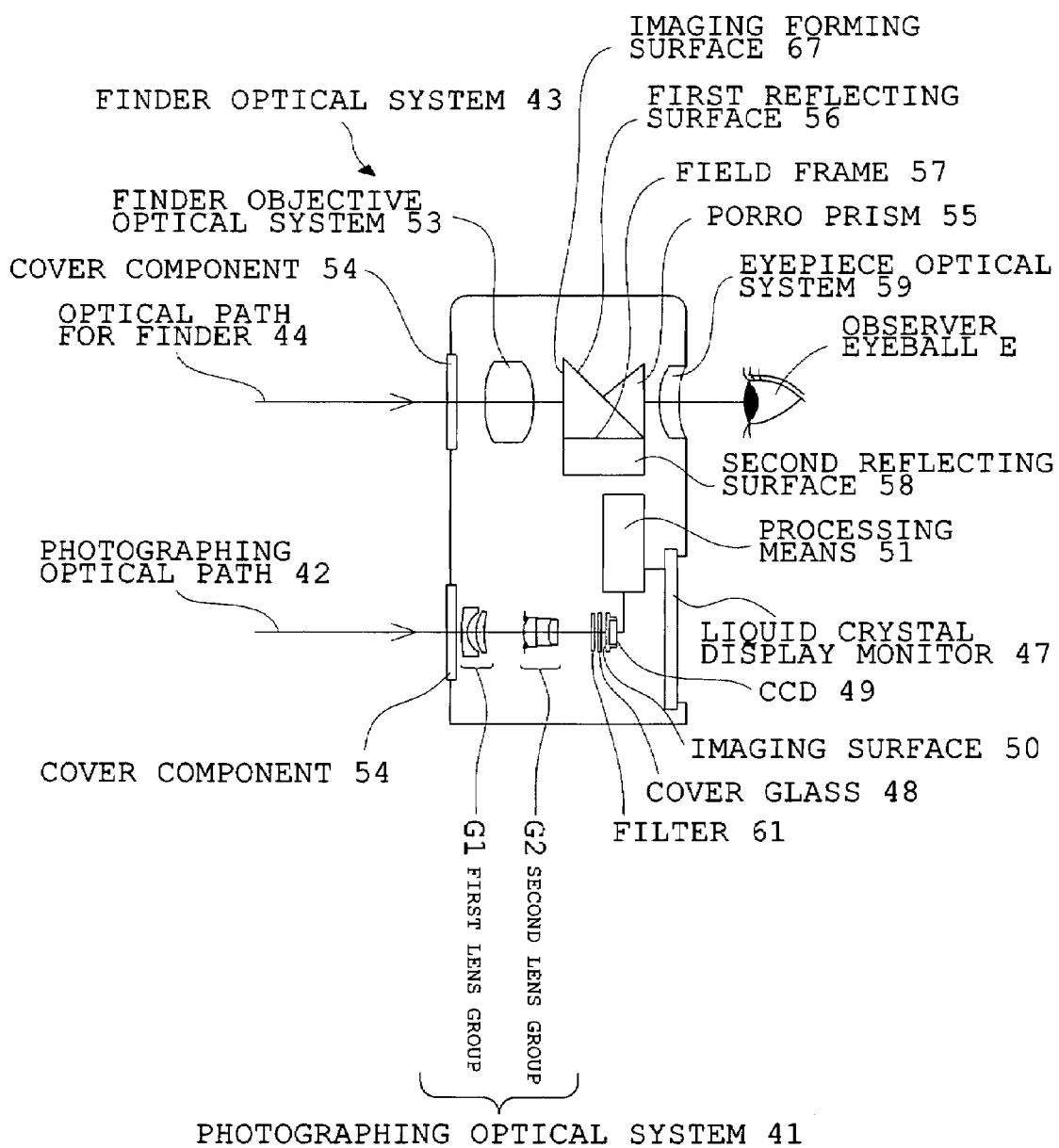
FIG. 8 is an outline-composition sectional view showing the composition of the digital camera of FIG. 6.

FIGS. 6-8 show a conceptual diagram where the two-group zoom lens according to the present invention is incorporated in the photographing optical system of an electronic camera, FIG. 6 is a front perspective diagram showing the outside view of a digital camera 40, FIG. 7 is a rear perspective view of the digital camera 40, and FIG. 8 is an outline block diagram showing the composition of the digital camera 40.

An electronic camera 40, in this example, includes a photographing optical system 41, having a photographing optical path 42; a finder optical system 43 having a finder optical path 44; a shutter button 45, a flash lamp 46 and a liquid crystal display monitor 47.

When the shutter button 45 provided on the upper portion of the camera 40 is pushed, photographing is performed through the photographing optical system 41 in association with the shutter 45. An object image produced by the photographing optical system 41 is formed on an image pick-up surface 50 of a CCD 49 through the filters 61 such as the low-pass filter and the infrared cutoff filter.

The object image received by the CCD 49 is displayed as an electronic image on the liquid crystal display monitor 47 provided on the backside of the camera through a processing means 51. The object image received by the CCD 49 is displayed as an electronic image on the liquid crystal display monitor 47 provided on the backside of the camera through a processing means 51. A memory can also be provided in the processing means 51 to record a photographed electronic image. Also, the memory may be provided to be independ-ent of the processing means 51, or may be constructed so that the image is electronically recorded and replay, for example, by a flexible disk, memory card, MO etc. The camera may be constructed as a film camera using a silver halide film instead of the CCD 49.

Further, a finder objective optical system 53 is located on the finder optical path 44. An object image produced on an imaging plane 42 of the finder objective optical system 53 is formed on a field frame 57 through a Porro prism 55 that is an image erecting member. Behind the Porro prism 55 is located an eye-piece optical system 50 that introduces an erect image into an observer's eye E. Also, cover members 54 are placed on the entrance sides of the photographing optical system 41 and the finder objective optical system 53 and on the exit side of the eyepiece optical system 59.

The digital camera 40 constituted in this way has an effect in thinning of a camera. Since the photographing optical system 41 is constituted by a two-group zoom lens in which a moderate angle of view can be secured, aberration is good, and filter etc. can be arranged, and good brightness is attained. Consequently, high performance is obtained and the photographing objective optical system 48 can be constructed with a small number of optical members, and a compact and low-cost design can be attained.

Figure 9:
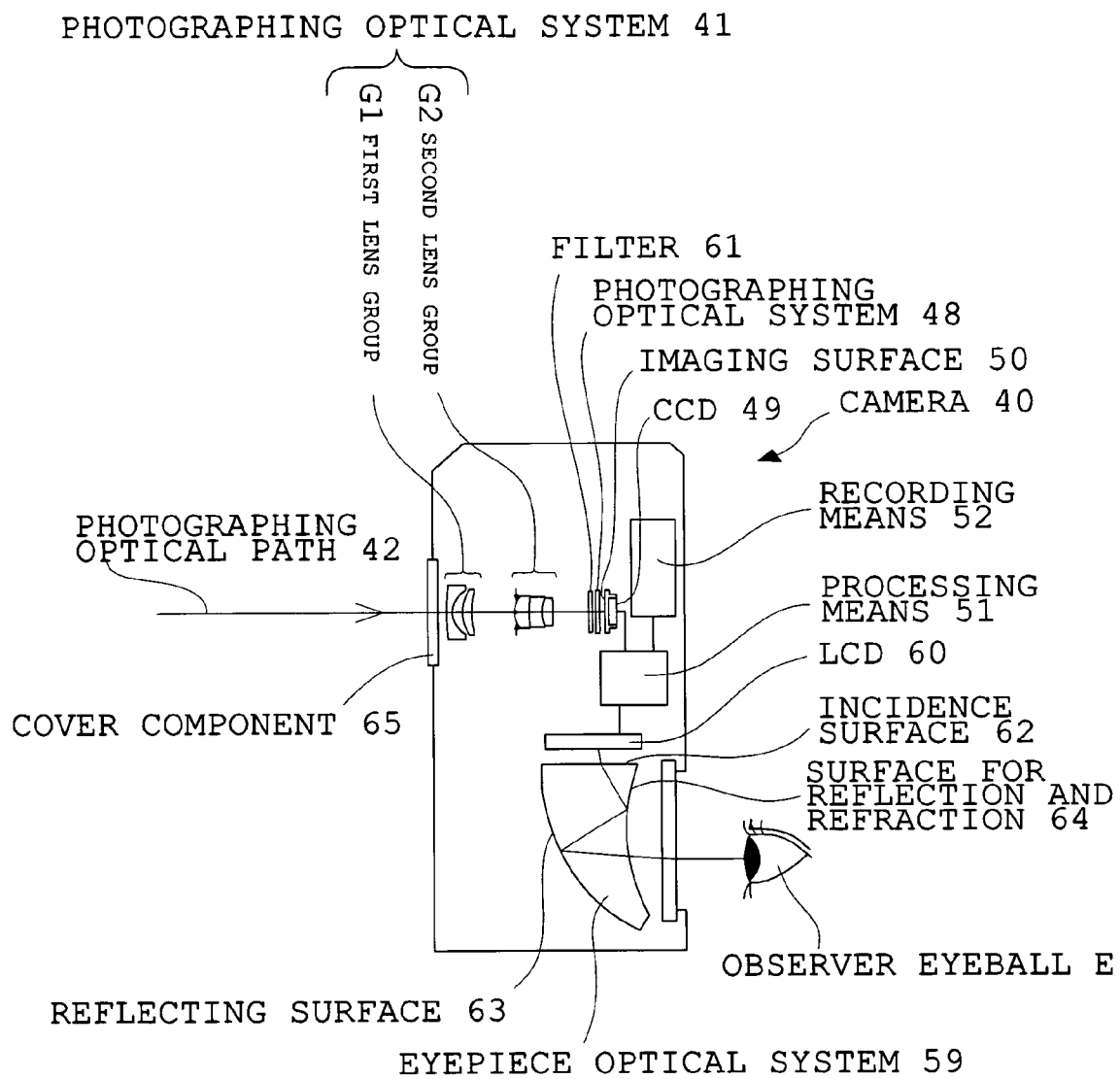
FIG. 9 is a conceptual diagram of another electronic camera which two-group zoom lens of the present invention is applied.

Next, FIG. 9 shows a conceptual diagram where the two-group zoom lens according to the present invention is incorporated in the photographing objective optical system of an electronic camera 40. In this case, the 2 group zoom lens of the present invention is used for the objective optical system for photographing 48 arranged on an optical path 42 for photographing. An object image formed by the objective optical system for photographing 48, is formed on the image pick-up surface 50 of CCD 49 through the filters 61 (a low pass filter, an infrared cut filter etc.). The object image which was received by this CCD49, is displayed as an electronic image on the liquid-crystal-display element (LCD) 60 through a processing means 51. Moreover, this processing means 51a is connected to a recording means 52, and the photographed electronic picture can also be recorded the object image photographed by CCD49 as electronic information. This record means 52 can be arranged independently from the processing means 51 and it can be constituted so that recording or playback may be performed electronically by using a flexible disk, memory card, MO, etc. The object image displayed on the LCD 60 is introduced into the observer's eye E through the eyepiece optical system 59.

The eyepiece optical system 59 is constituted with a decentered prism and in this example, includes three surfaces: an entrance surface 62, a reflecting surface 63, and a combined surface 64 of reflection and refraction. At least one of the reflection surface 63 having the reflecting function and the combined surface 64 of reflection and refraction, preferably both, provide power to a light beam and each of them is configured as a plane-symmetrical free-formed surface that is only one symmetrical surface correcting decentration aberration.

The digital camera 40 constituted in this way has an effect in thinning of a camera. Further, since the objective optical system for photographing 48 is constituted by the 2 group zoom lens which can secure a moderate angle of view, has good performance of aberration and of brightness, and a filter etc. can be arranged. Consequently, since high performance is obtained and the photographing objective optical system 48 can be constructed with a small number of optical members, a compact and low-cost design can be attained.

What is claimed is:

1. A zoom lens comprising,
in order from an object side,
a first lens group having negative refracting power,
a second lens group having positive refracting power,
wherein
a total number of the lens groups contained in the zoom lens is two, and
when magnification from a wide angle end to a telephoto end is performed, mutual interval between the first lens group and the second lens group is narrowed, and
when focusing is performed from a state in which focusing to an object point from the infinite distance to an object point at a short distance is performed, the first lens group is moved to the object side, and
the following conditions are satisfied, $$0.930 < |f_1|/\sqrt{(f_w \cdot f_T)} < 0.990$$

$$L_T/L_W > 1$$

$$1.0 < (\beta_{2w})^2 \times f_T/f_W < 1.20$$

$$1.2 < |\beta_{2T}| < 5$$

where
$f_1$ is a focal length of the first lens group,
fw is a focal length of the whole system of the zoom lens when focusing is performed at the infinite object point at a wide angle end
$f_T$ is a focal length of the whole system of the zoom lens when focusing is performed at the infinite object point at a telephoto end,
Lw is a distance from the surface top of the surface nearest to the object side of the first lens group to an image forming surface when focusing is performed at the infinite object point at the wide angle end, $L_T$ is an actual distance from the surface top of the surface nearest to the object side of the first lens group to an image forming surface when focusing is performed at the infinite object point at the telephoto end, $\beta_{2w}$ is lateral magnification of the second lens group when focusing to the object point at the infinite distance at the wide angle end is performed, and $\beta_{2T}$ is lateral magnification of the second lens group when focusing to the object point of the infinite distance at the telephoto end is performed.

2. The zoom lens according to claim 1, wherein the second lens group comprises two or more aspherical surfaces, an aspherical surface nearest to the object side among the two or more aspherical surfaces is formed to be an aspherical surface having positive refracting power which becomes weak as it departs from an optical axis, and the sign of curvature of the aspherical surface nearest to the image side of the two or more aspherical surfaces differs between that at a center where the aspherical surface intersects an optical axis and that at its circumferential portion.

3. The zoom lens according to claim 2, wherein the second lens group comprises one lens component, the total number of the lens component in the second lens group is one, where a lens component is defined as a lens having only two air contact surfaces within an effective diameter, which are a surface nearest to an object side and a surface nearest to an image side, to be constructed as a single lens or a cemented lens.

4. The zoom lens according to the claim 3, wherein the surface nearest to the object side and the surface nearest to the image side of the lens component are aspherical surfaces.

5. The zoom lens according to the claim 3, wherein the lens component is one cemented lens.

6. The zoom lens according to the claim 5, wherein the cemented lens of the lens component of the second lens group consists of, in order from the object side, a positive lens, a negative lens, and a positive lens, and;

the surface nearest to the object side and the surface nearest to the image side of the cemented lens are convex surfaces directed toward space sides on an optical axis, respectively.

7. The zoom lens according to the claim 1, wherein the first lens group comprises in order from the object side, a negative lens component having a concave surface directed toward the image surface side and a positive meniscus lens component having a convex surface directed toward the object side, and the total number of the lens components in the first lens group is two, and an absolute value of paraxial radius of curvature of the concave surface of the negative lens component is the smallest among the lens surfaces contacted with the air in the first lens group, where a lens component is defined as a lens having only two air contact surfaces within an effective diameter, which are a surface nearest to an object side and a surface nearest to an image side, to be constructed as a single lens or a cemented lens.

8. The zoom lens according to the claim 1, wherein the zoom lens comprises a aperture stop arranged between the first lens group and the second lens group, and the aperture stop is moved toward the same direction as the direction of movement of the second lens group to an image surface when magnification is performed.

9. The zoom lens according to the claim 8, wherein the aperture stop is arranged at the image side of a surface top of the lens nearest to the object side in the second lens group, and the aperture size of the aperture stop is fixed.

10. An electronic imaging apparatus comprising, the zoom lens of according to claim 1, and an electronic image pick-up element arranged at the image side of the zoom lens having a light receiving surface for converting an photographed subject image formed on an image pick-up surface of the zoom lens into an electrical signal.

* * * * *